(12) United States Patent
Yamazaki et al.

(10) Patent No.: US 11,926,185 B2
(45) Date of Patent: Mar. 12, 2024

(54) ELECTRICALLY POWERED SUSPENSION SYSTEM

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 525 days.

(21) Appl. No.: 17/176,346

(22) Filed: Feb. 16, 2021

(65) Prior Publication Data

US 2021/0252931 A1 Aug. 19, 2021

(30) Foreign Application Priority Data

Feb. 17, 2020 (JP) .................................. 2020-024609

(51) Int. Cl.
  *B60G 17/015* (2006.01)
  *B60G 17/017* (2006.01)
  *H02K 35/02* (2006.01)

(52) U.S. Cl.
  CPC ....... *B60G 17/0157* (2013.01); *B60G 17/017* (2013.01); *B60G 2202/422* (2013.01);
  (Continued)

(58) Field of Classification Search
  CPC ...... F16F 15/03; F16F 15/035; B60G 17/017; B60G 17/0157; B60G 17/06;
  (Continued)

(56) References Cited

U.S. PATENT DOCUMENTS

| 2,873,963 A | * | 2/1959 | Taylor ................... | B64C 25/60 |
| | | | | 188/269 |
| 3,194,355 A | * | 7/1965 | Jeromson, Jr. ......... | F16F 9/003 |
| | | | | 188/315 |

(Continued)

FOREIGN PATENT DOCUMENTS

| CN | 105264256 A | 1/2016 | |
| CN | 110429854 A | * 11/2019 | ............ H02K 35/02 |

(Continued)

OTHER PUBLICATIONS

Office Action received in corresponding Japanese application No. 2020-024609 dated Nov. 2, 2021 with English translation (8 pages).

(Continued)

*Primary Examiner* — Thomas J Williams
(74) *Attorney, Agent, or Firm* — Rankin, Hill & Clark LLP (57) ABSTRACT

An electrically powered suspension system performs an accurate vibration damping of a vehicle with low power consumption even if a linear motor of an electromagnetic actuator strokes to reach an irregular region and includes an electromagnetic actuator generating a driving force for the vibration damping. A linear motor of the actuator includes a cylindrical rod member provided with a plurality of on-rod armature coils along its axis and a housing surrounding the rod member, mounted movable back and forth along the axis with respect to the rod member, and provided with a plurality of permanent magnets along the axis. The on-rod armature coils located on ends of the rod member are provided with short-circuit parts b suppressing the rod member and the housing from moving back and forth with respect to each other.

5 Claims, 5 Drawing Sheets

(52) U.S. Cl.
CPC .... *B60G 2204/45* (2013.01); *B60G 2400/252* (2013.01); *B60G 2400/60* (2013.01); *H02K 35/02* (2013.01)

(58) Field of Classification Search
CPC ............ B60G 17/015; B60G 2202/422; B60G 2204/45; B60G 2400/252; B60G 2400/60
USPC ......................................................... 188/267
See application file for complete search history.

(56) References Cited

U.S. PATENT DOCUMENTS

| | | | | |
|---|---|---|---|---|
| 4,981,309 | A * | 1/1991 | Froeschle | B60G 17/01933 280/5.514 |
| 7,168,532 | B2 * | 1/2007 | Stewart | H02P 25/18 188/161 |
| 7,362,003 | B2 * | 4/2008 | Stewart | F03B 13/1845 310/13 |
| 8,629,572 | B1 * | 1/2014 | Phillips | F03B 13/16 290/53 |
| 10,047,717 | B1 * | 8/2018 | Phillips | F03B 13/20 |
| 2006/0181158 | A1 * | 8/2006 | Tajima | H02K 41/03 310/12.25 |
| 2009/0236192 | A1 * | 9/2009 | Takeuchi | F16F 6/00 188/267 |
| 2013/0127175 | A1 * | 5/2013 | Zuo | B60G 13/14 290/1 A |
| 2013/0270927 | A1 * | 10/2013 | Kakuchi | H02K 11/215 310/12.31 |
| 2014/0238793 | A1 * | 8/2014 | Nanbara | F16F 15/03 188/267 |
| 2015/0015352 | A1 * | 1/2015 | Satou | F16F 15/03 335/229 |
| 2016/0046165 | A1 | 2/2016 | Sano et al. | |
| 2017/0198401 | A1 * | 7/2017 | Phillips | H02K 35/02 |
| 2019/0264771 | A1 * | 8/2019 | Sakka | F16F 9/18 |
| 2021/0101426 | A1 * | 4/2021 | Olson | B60C 27/10 |
| 2021/0252931 | A1 * | 8/2021 | Yamazaki | B60G 17/06 |

FOREIGN PATENT DOCUMENTS

| | | | | |
|---|---|---|---|---|
| JP | 2001-310736 | A | | 11/2001 |
| JP | 2011-030368 | A | | 2/2011 |
| JP | 4756405 | B1 * | 8/2011 | ............ H02K 35/02 |
| JP | 5876764 | B2 | | 3/2016 |
| JP | 2018-182988 | A | | 11/2018 |
| JP | 6417443 | B1 | | 11/2018 |
| WO | WO-2019050114 | A1 * | 3/2019 | ............ H02K 35/02 |

OTHER PUBLICATIONS

Chinese Office Action received in corresponding Chinese application No. 202110189845.X dated Oct. 21, 2023 with English translation (12 pages).

* cited by examiner

ELECTRICALLY POWERED SUSPENSION SYSTEM

CROSS REFERENCE TO RELATED APPLICATIONS

This application claims the benefit of foreign priority to Japanese Patent Application No. 2020-024609, filed on Feb. 17, 2020, which is incorporated by reference in its entirety.

TECHNICAL FIELD

The present invention relates to an electrically powered suspension system that is disposed between a vehicle body and a wheel and includes an electromagnetic actuator. The electromagnetic actuator includes an electric motor that generates a driving force used for damping the vehicle vibration.

BACKGROUND ART

The applicant of the present application has proposed an electrically powered suspension system that is disposed between a vehicle body and a wheel and includes an electromagnetic actuator including an electric motor that generates a driving force used for damping of the vehicle vibration (for example, see Patent Literature (PTL) 1). The electromagnetic actuator described in PTL 1 includes a ball screw mechanism in addition to the electric motor. The electromagnetic actuator generates a driving force for the damping of the vehicle vibration by converting rotary motion of the electric motor into linear motion of the ball screw mechanism.

Further, some electromagnetic actuators included in the electrically powered suspension systems are known to use a linear motor (see, for example, PTL 2). The electromagnetic actuator according to PTL 2 includes a cylindrical stator and a hollow cylindrical moving element provided in a manner of surrounding the stator and moving back and forth in an axis. The stator is provided with an armature coil along the axis over an outer peripheral surface of its cylinder. On the other hand, the moving element is provided with a permanent magnet along the axis on its entire inner peripheral surface of the hollow cylinder.

The electrically powered suspension system according to PTL 2 generates an attractive force and a repulsive force between the armature coil of the stator and the permanent magnet of the moving element to cause the forces to drive the moving element to extend and contract in the axis with respect to the stator when the armature coil of the stator is excited.

Further, PTL 3 discloses an invention of an electrically powered suspension system in which an electromagnetic actuator according to PTL 2 is modified to be applied thereon.

The electromagnetic actuator according to PTL 3, as shown in FIG. 4 thereof, includes a first tubular member 111 constituting a part of a fixed part of a motor 10 and a second tubular member 121 constituting a part of a movable part of the motor 10. The first tubular member 111 is inserted into the second tubular member 121 in a state of being coaxially and axially displaceable relative to the second tubular member 121.

The first tubular member 111 is provided on its inner wall part with an electromagnetic coil 11 (first to third three-phase coil units 11A to 11C) along the axis. The second tubular member 121 is integrally provided with a columnar rod (shaft 123) that penetrates an axial center of the first tubular member 111. The rod (shaft 123) is provided with a plurality of permanent magnets 125 along the axis.

The electromagnetic actuator according to PTL 3, as shown in FIGS. 1 thereof, includes a motor drive device 1. The motor drive device 1 includes a drive circuit 20 of the motor 10 and a switch circuit 30. The drive circuit 20 generates a three-phase drive current supplied to each of the three-phase coil units 11A to 11C. The switch circuit 30 is interposed between the motor 10 and the drive circuit 20.

As shown in FIG. 3 of PTL 3, the switch circuit 30 is configured to be able to selectively switch between a connection state in which the output terminals 24A to 24C of the drive circuit 20 and the coil units 11A to 11C are connected respectively, and a short-circuited state in which the connections between the output terminals 24A to 24C and the coil units 11A to 11C are respectively shut off and the coils 11A to 11C are short-circuited with each other.

In the electromagnetic actuator according to PTL 3, in a case in which the power supply from a battery to the drive circuit 20 is normally kept, the first to third coil units 11A to 11C of the electromagnetic coil 11 are energization-controlled with the first to third drive current. When the first to third coil units 11A to 11C of the electromagnetic coil 11 are excited, magnetic field interactions act between the first to third coil units 11A to 11C provided on the inner wall portion of the first tubular member 111 and the plurality of permanent magnets 125 provided on the rod portion (the shaft 123). This results in a generation of an attractive force or a repulsive force whose strength varies according to strengths of the magnetic field between the above-described two parts. This regulates the output of the motor 10 to be variably adjusted so as to have an appropriate strength of damping force according to a vibration speed of each of the wheels.

On the other hand, when the power supply to the driving circuit 20 is cut off because of power failure or the like, the switch circuit 30 switches the connection state between the output terminals 24A to 24C and the coil units 11A to 11C to the short-circuit state that causes the coil units 11A to 11C to be short-circuited with each other. As a result, the three-phase coil units 11A to 11C are short-circuited with each other.

Then, when the rod part (the shaft 123 provided with the permanent magnet 125) is relatively displaced with respect to the electromagnetic coil 11, an induced electromotive force is generated in the electromagnetic coil 11 of the motor 10 by electromagnetic induction. However, the terminals of the electromagnetic coil 11 (the coil units 11A to 11C) are short-circuited with each other. Therefore, an induced current flows through each of the coil units 11A to 11C, which causes an electromagnetic force to act on the rod portion (the shaft 123) in a direction that hinders the movement of the rod portion (shaft 123). As a result, the vibration damping action from the motor 10 can be obtained even when the power supply to the drive circuit 20 is cut off.

[Citation List]

[Patent Literature]

PTL 1: Japan Patent No. 6417443

PTL 2: Japan Patent No. 5876764

PTL 3: Japan Unexamined Patent Publication No. 2018-182988

SUMMARY OF INVENTION

[Technical Problem]

However, in the electrically powered suspension systems according to PTLs 2 and 3 using a linear motor for an electromagnetic actuator, no special consideration is taken about carrying out a accurate vibration damping with low power consumption in a case in which a stroke of the linear motor reaches an irregular region beyond a regular region.

Therefore, in the electrically powered suspension system according to PTLs 2 and 3, in the case that the stroke of the linear motor reaches the irregular region, the accurate vibration damping may not be performed in the low power consumption.

The present invention is made in view of the above reason and its object is to provide an electrically powered suspension system that is able to perform the accurate vibration damping with the low power consumption.

[Solution to Problem]

To achieve the above object, the invention according to claim 1 discloses an electrically powered suspension system that is provided between a vehicle body and a vehicle wheel and includes an electromagnetic actuator generating a driving force for vibration damping of the vehicle, wherein the linear motor of the electromagnetic actuator includes a rod member and a housing surrounding the rod member and extending along the axis of the rod member; the rod member and the housing are placed so as to be freely movable back and forth along the axis with respect to each other; the rod member is provided with a plurality of armature coils along the axis and the housing is provided with a magnet member that exerts electromagnetic induction with each of the plurality of armature coils provided on the rod member, and the armature coils located on ends of the rod member among the plurality of the armature coils are provided with electromagnetic braking parts that restrict the relative back and forth movements along the axis between the rod member and the housing.

[Advantageous Effects of Invention]

According to the present invention, even in the case the stroke of the linear motor of the electromagnetic actuator reaches the irregular region, the accurate vibration damping is able to be performed with the low power consumption.

DESCRIPTION OF EMBODIMENTS

The electrically powered suspension system according to an embodiment of the present invention is described in detail below with reference to the drawings as appropriate.

In the drawings explained below, members having a common function is designated by a common reference sign. In addition, a size and shape of the member may be deformed or exaggerated to schematically illustrate the member for convenience of description.

<Configuration of Electrically Powered Suspension System of Embodiment>

First, an overall configuration of the electrically powered suspension system 11 according to the embodiment of the present invention is described with reference to FIGS. 1, 2A, and 2B.

Figure 1:
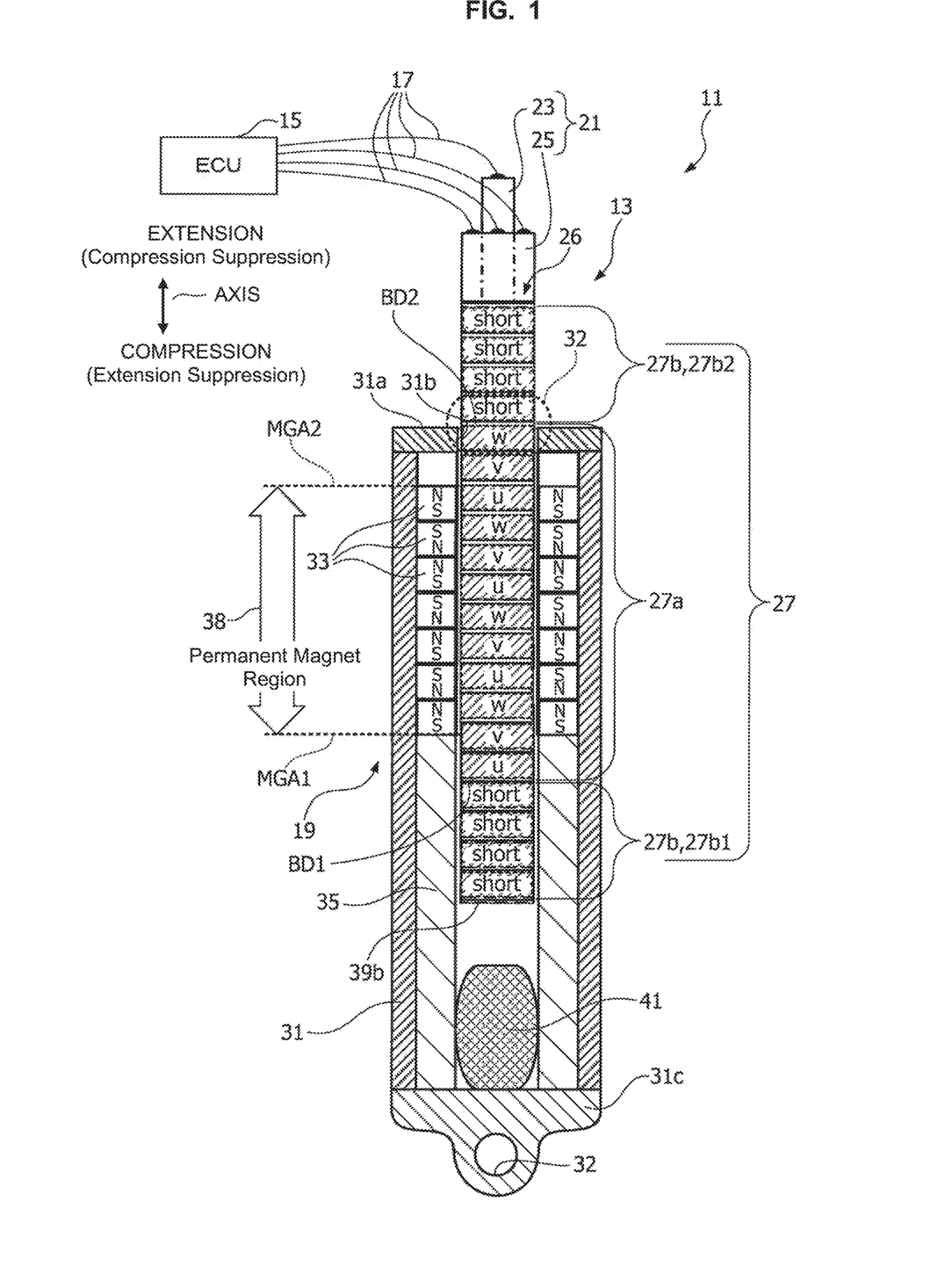
FIG. 1 is an overall configuration diagram of an electrically powered suspension system according to an embodiment of the present invention.

FIG. 1 is an overall configuration diagram of the electrically powered suspension system 11 according to the embodiment of the present invention. FIG. 2A is an external perspective view of an on-rod armature coils 27 mounted on a rod member 21 provided in the electromagnetic actuator 13 of the electrically powered suspension system 11. FIG. 2B is a partial vertical sectional view showing a part of the rod member 21 provided in the electromagnetic actuator 13 of the electrically powered suspension system 11.

As shown in FIG. 1, the electrically powered suspension system 11 according to the embodiment of the present invention is intended to achieve an appropriate vibration damping with low power consumption by employing a linear motor 19 for an electromagnetic actuator 13 even if a stroke of the electromagnetic actuator 13 reaches the irregular region.

In order to achieve the above object, the electrically powered suspension system 11 according to the embodiment of the present invention includes an electromagnetic actuator 13 generating a driving force for vibration damping of a vehicle (not shown) and an electronic control unit (hereinbelow referred to as "ECU") 15 and the like, as shown in FIG. 1, The electromagnetic actuator 13 and the ECU 15 are connected to each other via control power supply lines 17 for supplying control power to the electromagnetic actuator 13.

As shown in FIG. 1, the control power supply lines 17 are used to supply electric power to the on-rod armature coils 27 of three phases (u-phase, w-phase, v-phase) of the linear motor 19 (described below in detail) included in the electromagnetic actuator 13. The ECU 15 is connected respectively to a common terminal and a three-phase (u-phase, w-phase, v-phase) power supply terminals via the control power supply lines 17.

The electromagnetic actuator 13 is disposed for each wheel including front wheels (right front/left front wheels) and rear wheels (right rear/left rear wheels) of the vehicle, i.e., totally four actuators are disposed. The electromagnetic actuator 13 provided for each wheel is driven and controlled independently on each other by the ECU 15 in accordance with the extension/contraction drive of each wheel.

Each of the plurality of electromagnetic actuators 13 has a common configuration in the embodiment of the present invention. Accordingly, an explanation of the configuration on one electromagnetic actuator 13 represents descriptions of the plurality of electromagnetic actuators 13.

The electromagnetic actuator 13 employs the linear motor 19 as a source of a driving force for the vibration damping of the vehicle. More specifically, as shown in FIG. 1, the linear motor 19 of the electromagnetic actuator 13 is configured to include a cylindrical rod member 21, a hollow cylindrical housing 31 surrounding the rod member 21 and extending along the axis of the rod member 21 (see FIG. 1). The rod member 21 and the housing 31 are provided so as to be freely move back and forth with respect to each other along the axis of the rod member 21.

The rod member 21 has a function of moving back and forth along the axis with respect to the housing 31 by the driving force from the linear motor 19. In order to perform this function, the rod member 21 is configured to include a cylindrical shaft 23 and a hollow cylindrical pipe 25 surrounding the shaft 23, as shown in FIG. 1. The shaft 23 and the pipe 25 are arranged concentrically with each other.

The shaft 23 is mainly made of a conductive member, which is intended to use the shaft 23 itself for a power supply path to the on-rod armature coils 27 (a common terminal in this embodiment). However, the shaft 23 may be made of a member having no conductivity, in which case the shaft 23 is applied with a conductive surface treatment to ensure the function as the power supply path to the on-rod armature coils 27.

On the other hand, the pipe 25 is mainly made of a member having no conductivity. In order to supply power to the three-phase on-rod armature coils 27, the pipe 25 is provided with three power supply paths (not shown) for the three phases of power along the axis. Each of the three power supply paths is made of, for example, a coated electric wire for power supply. That is, the shaft 23 and the pipe 25 are provided with totally four power supply paths in order to supply power to the three-phase on-rod armature coils 27.

Figure 2A:
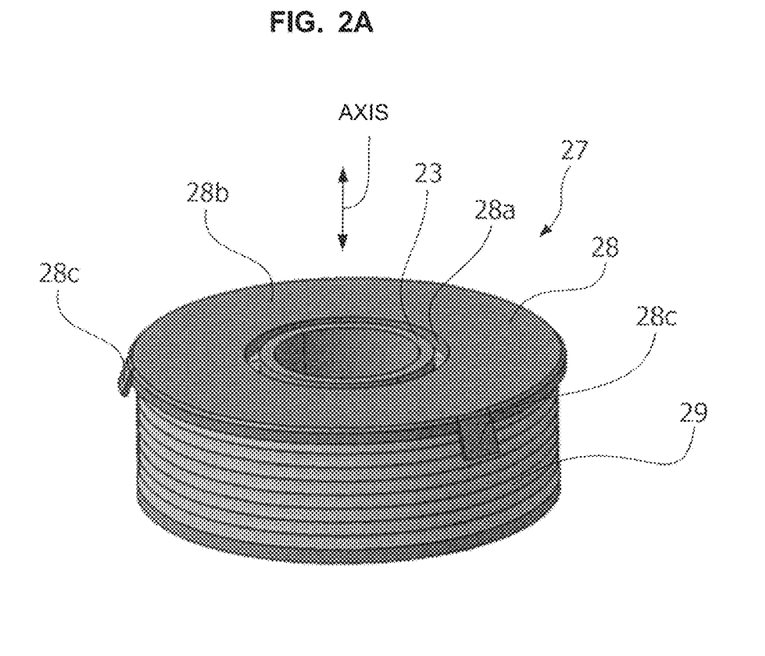
FIG. 2A is an external perspective view of an on-rod armature coil mounted on a rod member provided in an electromagnetic actuator of an electrically powered suspension system.
Figure 2B:
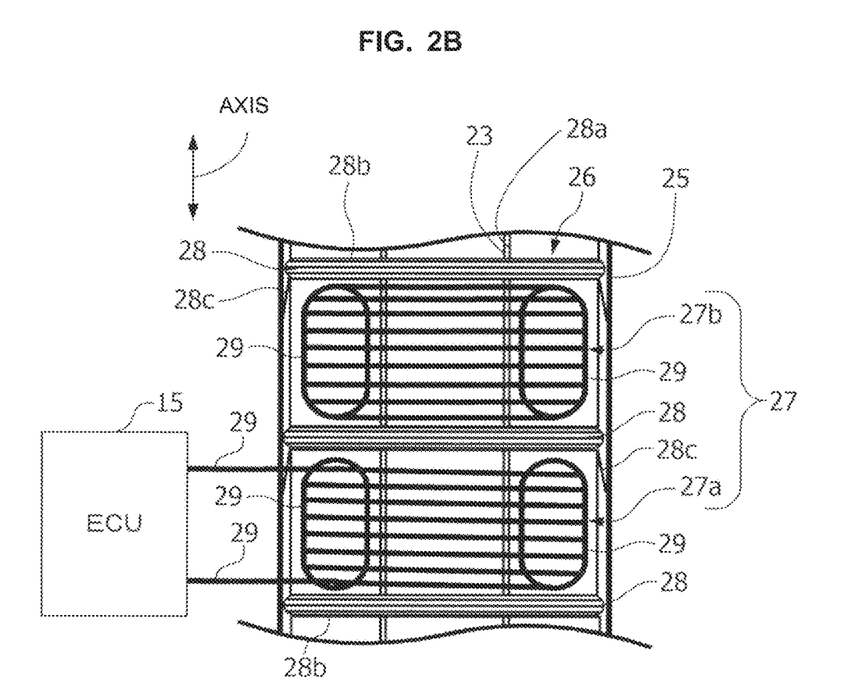
FIG. 2B is a partial vertical sectional view showing a part of the rod member provided in the electromagnetic actuator of the electrically powered suspension system.

As shown in FIGS. 1 and 2B, the plurality of on-rod armature coils 27 are provided in a stacked state along the axis in a circumferential gap 26 defined by an outer peripheral wall of the shaft 23 and an inner peripheral wall of the pipe 25.

As shown in FIGS. 1 and 2B, each of the on-rod armature coils 27 includes an excitation part 27a and a short-circuit part 27b formed by winding a coated electric wire 29. FIG. 2B shows an enlarged view of a boundary portion 32 between the excitation part 27a and the short-circuit part 27b (see a region surrounded by a dotted line in FIG. 1) in the on-rod armature coils 27 provided on the rod member 21 of the electromagnetic actuator 13 shown in FIG. 1. FIG. 2B shows differences of the excitation part 27a from the short-circuit part 27b in comparison thereof.

Note that the excitation part 27a and the short-circuit part 27b may be collectively referred to as the armature coils 27 when these are not needed to be especially distinguished. The on-rod armature coils 27 correspond to an "armature coil" provided in the "rod member" of the present invention. Hereinbelow, the "on-rod armature coils 27" may be abbreviated as "armature coils 27".

As shown in FIGS. 2A and 2B, the excitation part 27a is a coil for each phase to which each of the three-phase (u-phase, w-phase, v-phase) electric power is supplied. A common terminal is connected to one end of the coated electric wire 29 included in the coil, and a power supply terminal is connected to the other end. The common terminal is grounded. In addition, the power supply terminal is supplied with any one of the three-phase powers.

As shown in FIGS. 2A and 2B, the short-circuit part 27b is formed by short-circuiting a pair of terminals appearing at both ends of the coated electric wire 29 included in the coil.

As shown in FIGS. 2A and 2B, each of the on-rod armature coils 27 is formed by winding a coated electric wire 29 around a bobbin 28 having a spool shape. The bobbin 28 is made mainly of a conductive metal material such as aluminum, but it is not particularly limited thereto. As shown in FIG. 2A, the bobbin 28 has a circular through hole 28a opened at a center in its diameter along its axis. The coated electric wire 29 is formed by coating a wire made of metal such as copper with a sheath such as insulating resin.

In the excitation part 27a, a common terminal provided at one end of the coated electric wire 29 included in the coil is electrically connected to the through hole 28a of the bobbin 28. On the other hand, the power supply terminal provided at the other end of the coated electric wire 29 is electrically connected to a disc-shaped side end plate 28b of the bobbin 28.

Further, in the short-circuit part 27b, a pair of terminals appearing at the both ends of the coated electric wire 29 included in the coil are electrically connected to, for example, a through hole 28a of the bobbin 28.

When the plurality of on-rod armature coils 27 are stacked to be mounted in the gap 26 between the shaft 23 and the pipe 25, the adjacent on-rod armature coils 27 are joined through an insulating adhesive.

Consequently, the side end plates 28b of the bobbins 28 of the adjacent on-rod armature coils 27 are electrically insulated from each other.

The side end plate 28b of the bobbin 28 is provided along its circumference at intervals with a plurality of tongue pieces 28c inclining so as to protrude in a radial outward direction.

The through hole 28a of the bobbin 28 is electrically insulated from the side end plate 28b of the bobbin 28.

An inner diameter of the through hole 28a of the bobbin 28 is formed slightly larger than an outer diameter of the shaft 23. Further, an outer diameter of the side end plate 28b of the bobbin 28 is formed slightly smaller than an inner diameter of the pipe 25.

When mounting the on-rod armature coil 27 on the rod member 21, the on-rod armature coil 27 is mounted along the axis into the gap 26 between the shaft 23 and the pipe 25 in a restrained state while inserting the shaft 23 into the through hole 28a of the bobbin 28. This mounting of the on-rod armature coil 27 may use an adhesive.

In short, the outer peripheral surface of the shaft 23 is adherently contacted to the inner peripheral surface of the through hole 28a of the bobbin 28 in the on-rod armature coils 27 with the on-rod armature coils 27 mounted in the rod member 21. Similarly, the side end plate 28b of the bobbin 28 (particularly, the tongue piece 28c of the side end plate 28b) of the on-rod armature coils 27 is adherently contacted to the inner peripheral surface of the pipe 25.

This configuration ensures conductivity of the on-rod armature coils 27 with the shaft 23 and the pipe 25 of the rod member 21 and suppresses contact failure due to vibration.

Accordingly, in the excitation part 27a, one end of the control power supply line 17 is connected to the shaft 23 and the other end of the line 17 is connected to the coated electric wire for power supply, and thereby a power supply path is formed from the shaft 23 to the coated electric wire for power supply along the pipe 25 passing through the through hole 28a of the bobbin 28 (common terminal), the one end of the coated electric wire 29, the other end of the coated electric wire 29, the side end plate 28b of the bobbin 28 (power supply terminal), and the pipe 25.

In contrast, in the short-circuit part 27b, a pair of terminals appearing at the both ends of the covered wires 29 included by the coil 27 are isolated from the control power supply line 17. In other words, the pair of terminals are short-circuited therebetween.

Here is description of a configuration of the housing 31 and the plurality of the on-rod armature coils 27 provided in the rod member 21 that exerts electromagnetic induction on each other.

As shown in FIG. 1, the housing 31 is provided on its inner peripheral surface with the plurality of permanent magnets 33 along the axis facing the plurality of the on-rod armature coils 27 provided on the rod member 21. The plurality of the permanent magnets 33 are, as shown in FIG. 1, arranged in a direction in which polarities of magnetic poles adjacent to each other are the same.

An upper end of the housing 31, as shown in FIG. 1, is provided with a circular upper lid 31a that seals the upper end. The upper lid 31a has a circular through hole 31b, through which one of two ends of the rod member 21 is exposed above the upper lid 31a provided on the housing 31. The lower end of the housing 31 has a circular lower lid 31c that seals the lower end. The lower lid 31c is provided with a connecting portion 32 including a bolt insertion hole.

As shown in FIG. 1, the housing 31 is provided near a bottom of an internal space thereof with a bump stopper 41. The bump stopper 41 includes, for example, a urethane resin or a metal spring member. The bump stopper 41 plays a role of buffering the compression side stroke of the linear motor 19 when the linear motor 19 reaches the irregular region on the compression side (details is described below) that shows a sign of a situation in which the linear motor 19 falls into a bump state.

In the electromagnetic actuator 13, the connecting portion 32 of the housing 31 is connected and fixed to a unsprung member (not shown), for example, lower arm, knuckle, etc. on the wheel. On the other hand, an upper end of the rod member 21 is connected and fixed to a sprung member (not shown), for example, a strut tower part on a vehicle body. In short, the electromagnetic actuators 13 are arranged side by side on spring members (not shown) provided between the vehicle body and the wheels of the vehicle.

Further, as shown in FIG. 1, the housing 31 is provided with a cylindrical guide member 35 for guiding the advancing and retreating movement of the rod member 21 attached to the inner peripheral surface thereof.

Each of the three phase excitation parts 27a of the plurality of the on-rod armature coils 27, as shown in FIGS. 1 and 2B, are connected through a control power supply line 17 to an ECU 15. The ECU 15 operates so as to sequentially excite the three-phase (u-phase, w-phase, v-phase) excitation parts 27a according to the three-phase drive control signals generated by the inverter (not shown) provided in the ECU 15.

In the electromagnetic actuator 13 of the electrically powered suspension system 11, the linear motor 19 shown in FIG. 1 is configured by arranging the plurality of on-rod armature coils 27 provided on the rod member 21 and the plurality of permanent magnets 33 provided on the housing 31 so as to making them face each other.

The linear motor 19 causes the rod member 21 to move back and forth along the axis with respect to the housing 31 using the attractive force and the repulsive force due to the electromagnetic induction generated between both the three-phase excitation part 27a and the permanent magnet 33 by sequentially exciting the three-phase excitation parts 27a provided on the rod member 21.

Note that the electromagnetic actuator 13 of the electrically powered suspension system 11 has a movable range of the rod member 21 with respect to the housing 31 (stroke range of the linear motor 19) along the axis set in advance. The stroke range of the linear motor 19 is defined by a position of the rod member 21 with respect to the housing 31. Actually, the stroke range of the linear motor 19 is defined by a relative positional relationship between the plurality of permanent magnets 33 provided in the housing 31 and the plurality of on-rod armature coils 27 provided in the rod member 21.

FIG. 1 shows a permanent magnet region 38 in which the permanent magnets 33 provided in the housing 31 are arranged in the electromagnetic actuator 13 of the electrically powered suspension system 11. The permanent magnet region 38 has a first end, which is called MGA1, on the compression side relating to the stroke of the linear motor 19; and a second end, which is called MGA2, on the extension side.

The stroke range of the linear motor 19 is generally divided into a regular region that is a range that is commonly for regular use; and an irregular region that is a range exceeding the regular region and used on a receipt of an excessive strength of input. The irregular regions are configured respectively on the extension side and the compression side so as to sandwich the regular region therebetween.

In the example shown in FIG. 1, the regular region related to the stroke of the linear motor 19 is a region in which most of the excitation part 27a of the on-rod armature coils 27 faces the entire region of the permanent magnet region 38 expanding from the first end MGA1 to the second end MGA2. In addition, the irregular region related to the stroke of the linear motor 19 is a region of the on-rod armature coils 27 in which at least a part of the short-circuit part 27b is located facing the permanent magnet region 38.

The on-rod armature coils 27 provided on the rod member 21 includes the pair of short-circuit parts 27b interposing the excitation part 27a therebetween as shown, for example, in FIG. 1. There are two boundaries between the excitation part 27a and the pair of short-circuit parts 27b. A boundary between the excitation part 27a and a first short-circuit part 27b1 on the compression side (for suppressing expansion) is referred to as a first boundary portion BD1. On the other hand, a boundary between the excitation part 27a and a second short-circuit part 27b2 on the extension side (for suppressing compression) is referred to as a second boundary portion BD2.

Note that when it is not necessary to distinguish between the first short-circuit part 27b1 and the second short-circuit part 27b2, these parts are collectively referred to as "short-circuit part 27b".

In the example shown in FIG. 1, in the electromagnetic actuator 13 of the electrically powered suspension system 11, the entire region from the first end MGA1 to the second end MGA2 of the permanent magnet region 38 is located to face the excitation part 27a of the on-rod armature coils 27. In addition, both the first boundary portion BD1 and the second boundary portion BD2 of the on-rod armature coils 27 are located to protrude respectively outside the first end portion MGA1 and the second end portion MGA2 of the permanent magnet region 38 toward the compression side and the extension side. In addition, both of the amounts of the protrusions (stroke margins) are almost equal to each other.

In short, in the example shown in FIG. 1, the stroke position of the linear motor 19 is located substantially at the neutral position. The neutral position means a stroke position of the linear motor 19 at which stroke margins on the extension side and the compression side are substantially equal when a range from a full bump (maximum compression) state to a full rebump (maximum extension) state is defined as a stroke range of the linear motor 19.

Figure 3:
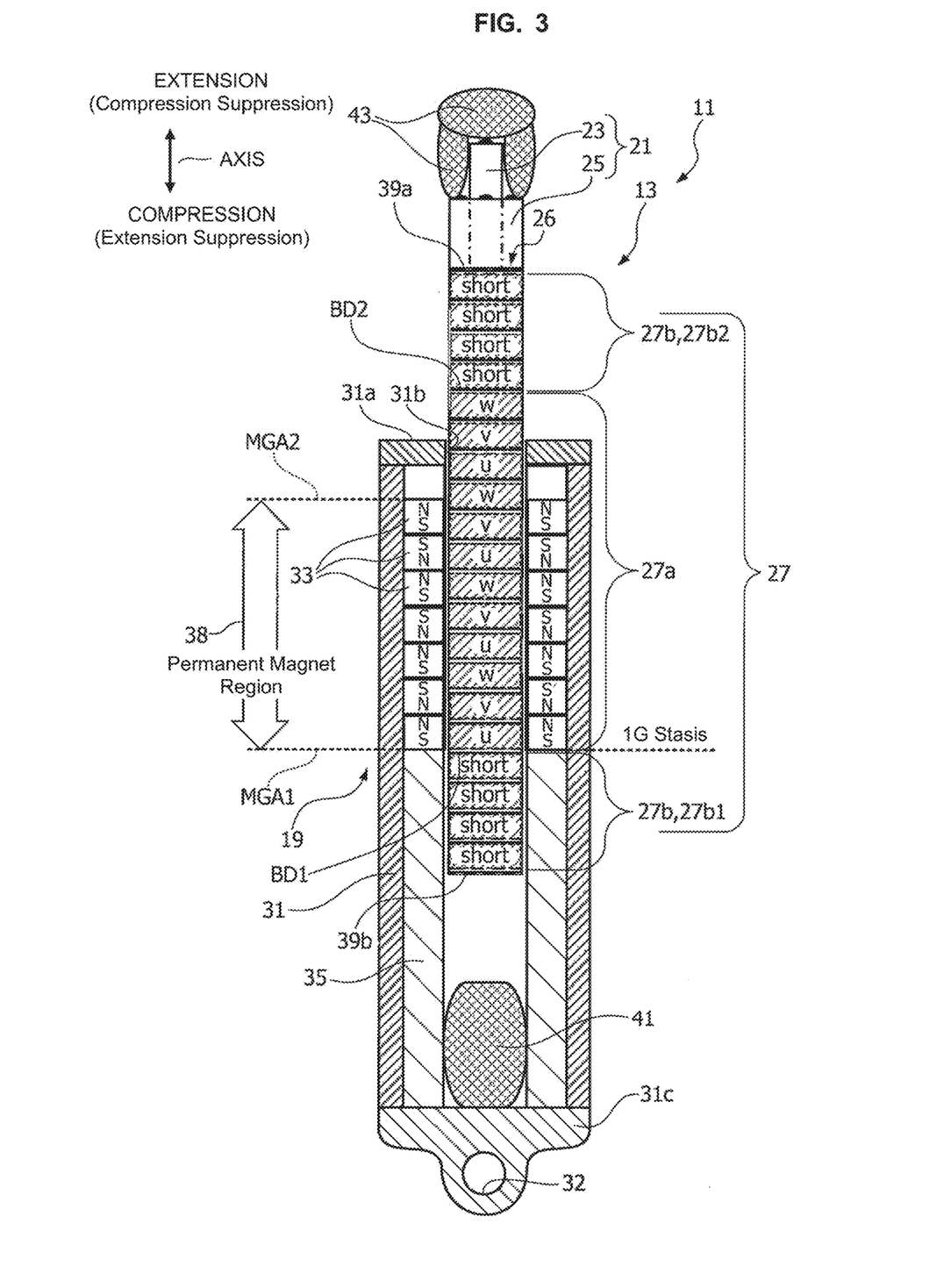
FIG. 3 is a diagram showing the electromagnetic actuator of the electrically powered suspension system provided in the host vehicle that is in a 1G stationary state.
Figure 4:
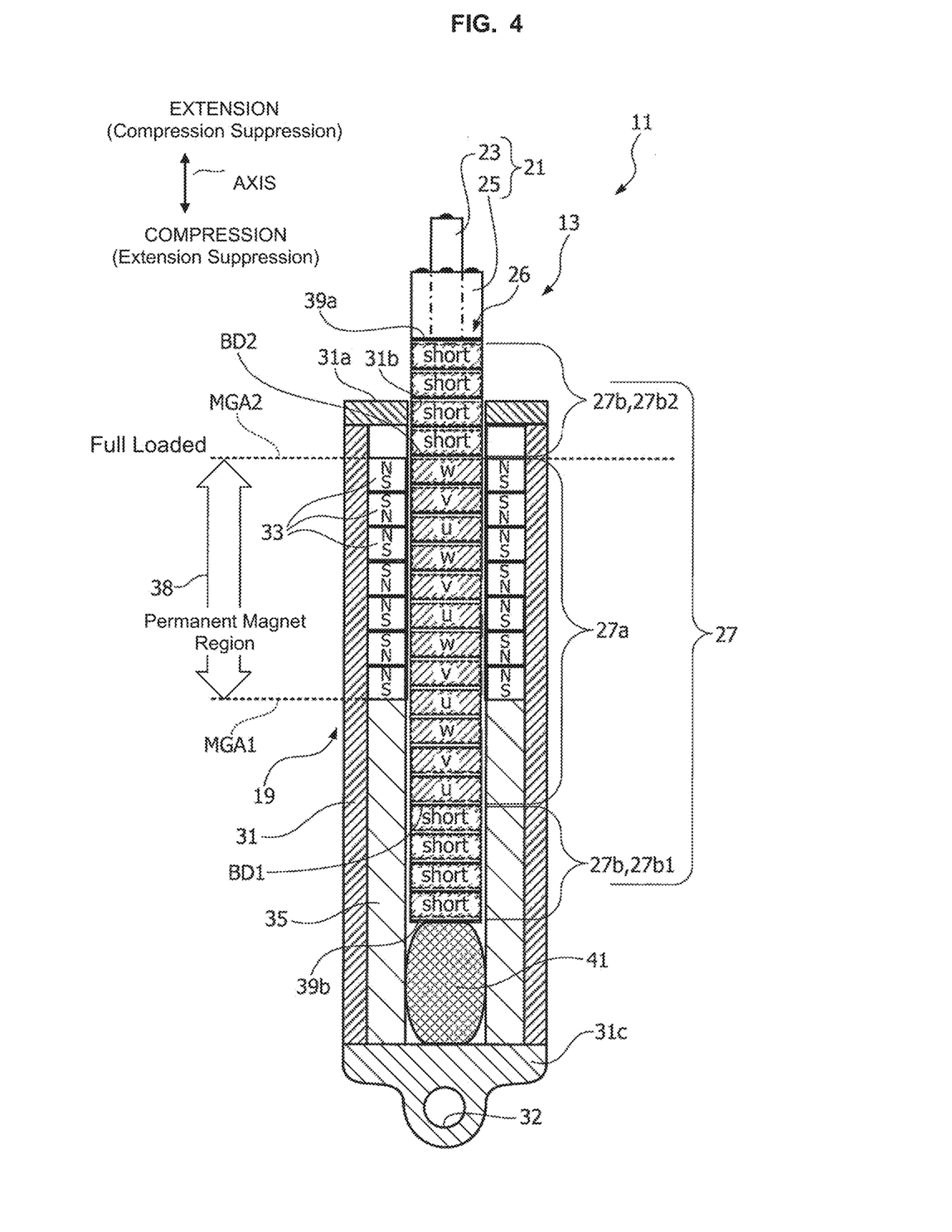
FIG. 4 is a diagram showing the electromagnetic actuator of the electrically powered suspension system provided in the host vehicle that is fully loaded.
Figure 5:
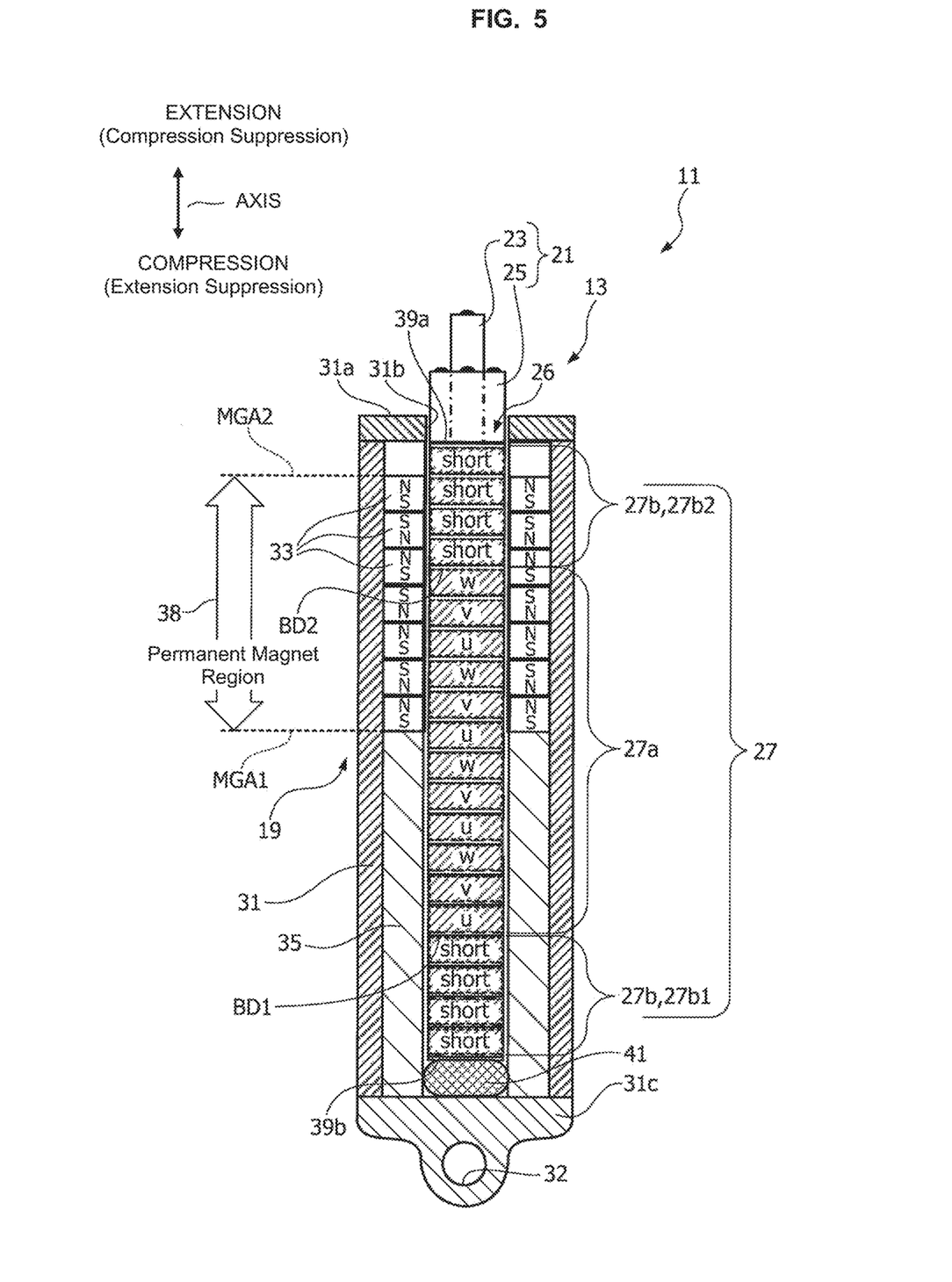
FIG. 5 is a diagram showing the electromagnetic actuator of the electrically powered suspension system provided in the host vehicle that is fully bumped.

Here is an example shown in FIGS. 3 to 5, in which example the stroke position of the linear motor 19 changes from the extension side to the compression side in the electromagnetic actuator 13 of the electrically powered suspension system 11. In FIGS. 3 to 5, the ECU 15 is not shown in order to eliminate complexity of the drawings.

FIG. 3 is a diagram showing an electromagnetic actuator 13 of an electrically powered suspension system 11 provided in the host vehicle that is in a 1G stationary state. FIG. 4 is a diagram showing an electromagnetic actuator 13 of an electrically powered suspension system 11 provided in the host vehicle that is fully loaded. FIG. 5 is a diagram showing an electromagnetic actuator 13 of the electrically powered suspension system 11 provided in the host vehicle that is at full bump.

In the example shown in FIG. 3, in the electromagnetic actuator 13 of the electrically powered suspension system 11, whole of the region ranging from the first end MGA1 to the second end MGA2 of the permanent magnet region 38 is located facing the excitation part 27a of the on-rod armature coils 27. However, a first boundary portion BD1 of the on-rod armature coils 27 and the first end portion MGA1 of the permanent magnet region 38 are located in a position in which they are overlapped with each other.

In short, in the example shown in FIG. 3, the stroke position of the linear motor 19 is at a full rebump predictive position that predicts the full rebump (maximum extension) near the extension side as compared with the neutral position. As shown in FIG. 3, a rebump stopper 43 is provided near an end of the extension side of the rod member 21. The rebump stopper 43 is made of, for example, a urethane resin or a metal spring member. The rebump stopper 43 plays a role of buffering a stroke at the extension side of the linear motor 19 when it reaches the irregular region on the extension side (details is described below), which predicts a situation in which the linear motor 19 falls into the rebump state.

Note that, as shown in FIG. 3, the irregular region on the extension-side related to the stroke of the linear motor 19 is a region in which the first short-circuit part 27b1 for suppressing extension of the on-rod armature coils 27 provided on the rod member 21 overlaps on the permanent magnet region 38.

Further, in the example shown in FIG. 4, in the electromagnetic actuator 13 of the electrically powered suspension system 11, the entire region from the first end MGA1 to the second end MGA2 of the permanent magnet region 38 is located facing the excitation part 27a of the on-rod armature coils 27. Note that the second boundary portion BD2 of the on-rod armature coils 27 and the second end portion MGA2 of the permanent magnet region 38 are located so as to overlap each other.

In short, in the example shown in FIG. 4, the stroke position of the linear motor 19 is at a full bump predictive position that predicts the full bump (maximum compression) near the compression side as compared with the neutral position.

Note that the irregular region on the compression side related to the stroke of the linear motor 19 is a region in which the second short-circuit part 27b2 for the compression suppression of the on-rod armature coils 27 provided on the rod member 21 is located so as to overlap the permanent magnet region 38, as shown in FIGS. 4 and 5.

The electromagnetic actuator 13 configured as described above operates as follows. For example, in a case in which a force related to thrust-up vibration is input from the vehicle wheel to the connecting portion 32 of the housing 31, and the stroke of the linear motor 19 on receiving this input converges to the regular region, the rod member 21 is about to move like thrusting-up accompanying with the housing 31 to which the force due to the thrust-up vibration is applied. At this time, electromagnetic induction phenomenon occurs between the permanent magnet 33 provided in the housing 31 and the excitation part 27a of the on-rod armature coils 27 provided on the rod member 21, which generates a force in the linear motor 19 directing in a direction of erasing the thrust-up movement of the rod member 21.

In this way, generating a force in the linear motor 19 in the direction of erasing the thrust-up movement of the rod member 21 can damp the vibration being about to be transmitted from the wheel to the vehicle body.

On the other hand, in a case in which a force related to thrust-up vibration is input from the vehicle wheel to the connecting portion 32 of the housing 31, and the stroke of the linear motor 19 on receiving this input converges to the irregular region, the rod member 21 is about to move like thrusting-up accompanying with the housing 31 to which the force due to the thrust-up vibration is applied. At this time, electromagnetic induction phenomenon occurs between the permanent magnet 33 provided in the housing 31 and the excitation part 27b of the on-rod armature coils 27 provided on the rod member 21.

Here is given detailed description of the above behavior. First, due to a force related to the thrust-up vibration, a relative displacement is occurred between the permanent magnet 33 provided in the housing 31 and the short-circuit part 27b of the armature coils 27 provided on the rod member 21. Then, electromagnetic induction phenomenon occurs between the permanent magnet 33 and the short-circuit part 27b of the armature coils 27, and the electromagnetic induction is about to generate an induced electromotive force on the short-circuit part 27b of the armature coils 27. However, the pair of terminals of the armature coils 27 are short-circuited. Therefore, no induced current flows through the armature coils 27. As a result, an electromagnetic force acts on the rod member 21 in a direction that cancels the induced electromotive force, that is, a direction in which the movement of the rod member 21 due to the force related to the thrust-up vibration is hindered). This allows obtaining a damping action against the thrust-up vibration.

In short, in the case in which the stroke of the linear motor 19 reaches the irregular region when the input related to the thrust-up vibration is received, there is generated a powerful force in the linear motor 19 in the direction of cancelling the movement of the rod member 21 due to the thrust-up compared with the case in which the stroke of the linear motor 19 is converged in the regular region.

As described above, in the case in which the force related to the thrust-up vibration is input from the wheel of the vehicle to the connecting portion 32 of the housing 31, and in particular, the stroke of the linear motor 19 on receiving this input reaches even the irregular region, the linear motor 19 is generated with the powerful force in the direction of cancelling the thrust-up movement of the rod member 21 so that the vibration transmitted from the wheel to the vehicle body can be damped.

According to the electrically powered suspension system 11 in the embodiment of the present invention, the armature coil positioned at the end of the rod member 21 among the plurality of on-rod armature coils 27 are provided with an electromagnetic braking part (the short-circuit part 27b) that suppresses the forth and backward movement along the axis between the rod member 21 and the housing 31, and therefore using the linear motor 19 as the electromagnetic actuator 13 allows the accurate vibration damping to be performed with the low power consumption even in the case in which the stroke of the linear motor 19 reaches the irregular region.

<Effect of Electrically Powered Suspension System 11 of Present Embodiment>

The electrically powered suspension system 11 according to the first aspect of the present invention is placed between the vehicle body and the wheels of the vehicle, and provided with the electromagnetic actuator 13 generating the driving force for vibration damping of the vehicle, wherein the linear motor 19 of the electromagnetic actuator 13 includes the rod member 21 and the housing 31 surrounding the rod member 21 and extending along the axis of the rod member 21. The rod member 21 and the housing 31 are arranged so as to be movable back and forth with respect to each other along the axis.

The rod member 21 is provided with the plurality of armature coils (the on-rod armature coils 27) along the axis, while the housing 31 is provided with the magnet member (the permanent magnet 33) that provides electromagnetic induction between each of the plurality of armature coils 27 provided on the rod member 21.

Among the plurality of armature coils 27, the armature coils located on the end of the rod member 21 includes the electromagnetic braking part (the short-circuit part 27*b*) that suppresses the back and forth movement along the axis between the rod member 21 and the housing 31.

In the electrically powered suspension system 11 according to the first aspect, the permanent magnet 33 may be preferably used for the magnet member provided in the housing 31. An electromagnet (armature coil) may be used in place of or in addition to the permanent magnet 33.

The plurality of armature coils 27 are supplied with, for example, the three-phase control power for each of the armature coils 27. In addition, among the plurality of armature coils 27, the armature coils 27 located on the end of the rod member 21 is equipped with the electromagnetic braking part (the short circuit part 27*b*) that suppresses the back-and-forth movement along the axis between the rod member 21 and the housing 31.

Expected actions of the electrically powered suspension system 11 according to the first aspect are as follows:
in a case in which the stroke of the linear motor 19 of the electromagnetic actuator 13 is in the regular region, electromagnetic induction is generated between the armature coils 27 (the exciting portion 27*a*) located near a central portion of the rod member 21, to which armature coils 27 the three-phase control power is supplied. This electromagnetic induction causes a force suppressing the back-and-forth movement along the axis between the rod member 21 and the housing 31. This force requires supply of the control power to the armature coils 27 (the excited portion 27*a*).

On the other hand, when the stroke of the linear motor 19 of the electromagnetic actuator 13 reaches the irregular region, electromagnetic induction is generated between the armature coils 27 that is located on the end of the rod member 21 and provided with the electromagnetic braking part (the short-circuit part 27*b*) and the magnet member (the permanent magnet 33) provided in the housing 31. This electromagnetic induction causes a force that has a strength corresponding to the stroke speed of the linear motor 19 and suppresses the back-and-forth movement along the axis between the rod member 21 and the housing 31. This force does not require the supply of the control power to the armature coils 27. This is because the armature coils 27 located on the end of the rod member 21 is provided with the electromagnetic braking part (the short-circuit part 27*b*).

The electrically powered suspension system 11 according to the first aspect is able to carry out the accurate vibration damping with the low power consumption, even the case in which the stroke of the linear motor 19 of the electromagnetic actuator 13 reaches up to the irregular region.

Further, because the armature coils 27 located on the end of the rod member 21 is equipped with the electromagnetic braking part (the short-circuit part 27*b*), the electrical resistance of the linear motor 19 of the electromagnetic actuator 13 is able to be lowered in an entire system. This results in an improvement in the efficiency of the entire system.

Further, the electrically powered suspension system 11 according to the second aspect is configured to have the electromagnetic braking part in the electrically powered suspension system 11 according to the first aspect, wherein the electromagnetic braking part is provided with the short-circuit part 27*b* that short-circuits between a pair of terminals equipped at the armature coils 27 located on the end of the rod member 21 and suppresses the back and forth movement by causing the short-circuit part 27*b* and the magnet member (the permanent magnet 33) provided in the housing 31 to generate electromagnetic induction therebetween.

In the electrically powered suspension system 11 according to the second aspect, the electromagnetic braking part causes the electromagnetic induction between the short-circuit part 27*b* and the magnet member (the permanent magnet 33) provided on the housing 31 to suppress the back and forth movement. Therefore, the appropriate vibration damping can be achieved with the low power consumption similarly to the electrically powered suspension system 11 according to the first aspect, even in the case in which the stroke of the linear motor 19 reaches up to the irregular region.

Furthermore, the electrically powered suspension system 11 according to the third aspect may be configured to include an electromagnetic braking part (the short-circuit part 27*b*) at each of the armature coils 27 located respectively on the extension side and the compression side of the rod member 21 of the electrically powered suspension system 11 according to the first or second aspect.

In the electrically powered suspension system 11 according to the third aspect, the armature coils 27 respectively located the extension side and the compression side of the rod member 21 are provided with the electromagnetic braking part (the first and second short-circuit part 27*b*1, 27*b*2), and therefore it is possible to perform the vibration damping on both the extension side and the compression side as compared with the electrically powered suspension system 11 according to the first or second aspect.

In addition, the electrically powered suspension system 11 according to the third aspect may be configured to have a plurality of armature coils 27 located on the end of the rod member 21 and provided with the first and second short-circuit parts 27*b*1, 27*b*2 are provided, wherein the numbers of turns of the windings in the plurality of armature coils 27 are different from each other (larger by step by step) so that the number of turns in the plurality of armature coils 27 becomes larger as the armature coils 27 locate nearer the end of the rod member 21.

With this configuration, the vibration damping force is able to be increased as the stroke of the linear motor 19 of the electromagnetic actuator 13 enters more inside the irregular region on the extension side or the compression side.

Further, the electrically powered suspension system 11 according to the fourth aspect is based on the electrically powered suspension system 11 according to any one of the first to third viewpoints and may be configured so that the stroke margin on the compression side of the linear motor 19 of the electromagnetic actuator 13 is larger than that on the extension side.

According to the electrically powered suspension system 11 according to the fourth aspect, the stroke margin of the linear motor 19 of the electromagnetic actuator 13 when the vehicle is in a 1G stationary state is larger on the compression side than on the extension side, and therefore the effect of more accurately dampening the vibration on the compression stroke side due to traveling of the vehicle can be obtained, when the vehicle shifts from the 1G stationary state to the traveling state.

The electrically powered suspension system 11 according to the fifth aspect is based on the electrically powered suspension system 11 according to the fourth aspect, and may be configured to further include the stoppers (the bump stopper 41 and rebump stopper 43) that suppresses the back and forth movement along the axis between the rod member 21 and the housing 31, wherein the stoppers 41 and 43 are configured so that their suppressing actions on the back and forth movement work with a time delay as compared to the action of suppressing the back and forth movement by the electromagnetic braking part (the short-circuit part 27*b*) when the stroke reaching the irregular region of the linear motor 19 included in the electromagnetic actuator 13 occurs.

In the electrically powered suspension system 11 according to the fifth aspect, when the stroke of the linear motor 19 of the electromagnetic actuator 13 occurs to reach the irregular region, first, the electromagnetic braking part acts to suppress the back and forth movement, and then after the time delay the stoppers 41 and 43 act to suppress the back and forth movement.

According to the electrically powered suspension system 11 according to the fifth aspect, when the stroke of the linear motor 19 of the electromagnetic actuator 13 occurs to reach the irregular region, the stoppers 41 and 43 is able to overlappingly act to suppress the back and forth movement after the time delay during the action of suppressing the back and forth movement by the electromagnetic braking part occurs, so that the vibration damping of the linear motor 19 of the electromagnetic actuator 13 can be smoothly and accurately performed.

Further, the electrically powered suspension system 11 according to the sixth aspect is based on the electrically powered suspension system 11 according to the fourth or fifth aspect, wherein the electromagnetic braking part (the first and second short-circuit parts 27*b*1 and 27*b*2) may be configured so that the effect of suppressing the back and forth movement acts when the vehicle enters in a load state exceeding the 1G stationary state.

In the electrically powered suspension system 11 according to the sixth aspect, the action of suppressing the back and forth movement by the electromagnetic braking parts (the first and second short-circuit parts 27*b*1, 27*b*2) may be caused to work when the vehicle is the load condition exceeding the 1G stationary state or the full load condition depending on settings of the electromagnetic braking part. The case of the vehicle load state exceeding the 1G stationary state means a case in which the linear motor 19 is in an overload state in which it strokes to reach up to the irregular region on the extension side. And, the case of the vehicle load state exceeding the full load state means a case in which the linear motor 19 is in an overload state in which the linear motor 19 strokes to reach up to the irregular region on the compression side.

In the electrically powered suspension system 11 according to the sixth aspect, the suppression of back and forth movement by the electromagnetic braking part unit acts when the vehicle is in the load state exceeding the 1G stationary state or the full load state depending on the settings of the electromagnetic braking part parts, Therefore, even if the linear motor 19 of the electromagnetic actuator 13 is in the overloaded state of stroking until it reaches the irregular region on the extension side or the compression side, the vibration damping of the linear motor 19 is able to be carried out accurately and reliably.

Furthermore, the electrically powered suspension system 11 according to the seventh aspect is an electrically powered suspension system 11 provided between the vehicle body and the wheel of the vehicle and includes the electromagnetic actuator 13 for generating a driving force for vibration damping of the vehicle, wherein the linear motor 19 of the electromagnetic actuator 13 includes a rod member 21 and a housing 31 that surrounds the rod member 21 and extends along the axis of the rod member 21. The rod member 21 and the housing 31 are mounted so as to be movable back and forth along the axis.

The housing 31 is provided with a plurality of armature coils along the axis, while the rod member 21 is provided with a magnet member that exerts electromagnetic induction with each of the plurality of armature coils 27 provided in the housing 31.

Among the plurality of armature coils 27, the armature coil located on the end of the housing 31 is provided with an electromagnetic braking part that suppresses the back-and-forth movement along the axis between the rod member 21 and the housing 31. This electromagnetic braking part is configured by causing the electromagnetic induction between the armature coil and the magnet member provided on the rod member 21 in a state in which the pair of terminals provided on the armature coil located on the end of the housing 31 are short-circuited to connect each other.

Difference between the electrically powered suspension system 11 according to the first aspect and the electrically powered suspension system 11 according to the seventh aspect is as follows:
in the electrically powered suspension system 11 according to the first aspect, the rod member 21 is provided with the plurality of armature coils (the on-rod armature coils 27) along the axis, while the housing 31 is provided with the magnet member (the permanent magnet 33) that exerts the electromagnetic induction with each of the plurality of armature coils 27 provided on the rod member 21.

On the other hand, in the electrically powered suspension system 11 according to the seventh aspect, the housing 31 is provided with the plurality of armature coils along the axis, while the rod member 21 is provided with the magnet member that exerts the electromagnetic induction with the plurality of armature coils 27 provided in the housing 31.

In short, the electrically powered suspension system 11 according to the first aspect and the electrically powered suspension system 11 according to the seventh aspect differ in that which of the housing 31 and the rod member 21 is respectively provided with which member of the plurality of armature coils and the magnet member. Other configurations are common to both of the electrically powered suspension systems 11.

According to the electrically powered suspension system 11 according to the seventh aspect, even in the case in which the stroke of the linear motor 19 of the electromagnetic actuator 13 reaches the irregular region, the accurate vibration damping is able to be performed with the low power consumption, in the same manner as the electrically powered suspension system 11 according to the first aspect.

Further, because the armature coils 27 located on the end of the housing 31 is provided with the electromagnetic braking part formed by short-circuiting the pair of terminals provided in the armature coils 27, an electrical resistance of the linear motor 19 of the electromagnetic actuator 13 in an entire system is able to be limited to a low level. As a result, the efficiency of the entire system is able to be improved.

<Other Embodiments>

The plurality of embodiments described above show examples for implementations of the present invention. Therefore, the technical scope of the present invention should not be construed to be limited to these embodiments. The present invention may be implemented in various embodiments without departing from the gist or the main features of the present invention.

For example, an electromagnetic actuator 13 provided in the electrically powered suspension system 11 according to the embodiment of the present invention is exemplified to include the cylindrical rod member 21 and the housing 31 that surrounds the rod member 21 and extends along the axis of the rod member 21 to describe the present invention, but the present invention is not limited to this example.

For example, as the cross-sectional shape of the rod member 21 may be any shape such as an elliptical shape. In this case, it is enough that the cross-sectional shape of the housing 31 may be a cross-sectional shape having an inner peripheral wall capable of receiving an outer peripheral wall of the rod member 21 with a slight gap therebetween.

Further, in the electromagnetic actuator 13 provided in the electrically powered suspension system 11 according to the embodiment of the present invention, the number of the on-rod armature coils 27 provided on the rod member 21 is not limited to the number disclosed in the embodiment of the present invention, and may be appropriately set according to a design specifications of the linear motor.

Similarly, the number of the plurality of the magnet members provided on the housing 31 (the permanent magnet 33) also is not limited to the disclosed quantities in the embodiments of the present invention, and may be set as appropriate depending on the design specifications of the linear motor.

Further, in the electromagnetic actuator 13 provided in the electrically powered suspension system 11 according to the embodiment of the present invention, orientations of the magnetic poles of the plurality of the magnet members (the permanent magnets 33) provided in the housing 31 are not limited to the orientation disclosed in the embodiment of the present invention, and may be appropriately set according to the design specifications of the linear motor.

Further, in the description of the electrically powered suspension system 11 according to the embodiment of the present invention, the electromagnetic actuator 13 is given with the example of arranging it on both the front wheels (right and left front wheels) and the rear wheels (right and left rear wheels), totally four, but the present invention is not limited thereto. The electrically powered suspension system 11 according to the embodiment of the present invention may be configured to arrange two electromagnetic actuators 13 in total on either the front wheels or the rear wheels.

[Reference Numerals]
11: electrically powered suspension system
13: Electromagnetic Actuator
19: Linear Motor
21: Rod Member
23: Shaft
25: Gap Between Shaft and Pipe
26: Shaft and The Pipe Section
27: On-Rod Armature Coil (Armature Coil)
27a': Excitation Part
27b: Short-Circuit Part
27b1: First Short-Circuit Part (Short-Circuit Part, Electromagnetic Braking Part)
27b2: Second Short-Circuit Part (Short-Circuit Part, Electromagnetic Braking Part)
31: Housing
33: Permanent Magnet (Magnet Member)
41: Bump Stopper (Stopper)
43: Rebump Stopper (Stopper)

The invention claimed is:

1. An electrically powered suspension system mounted between a body and a wheel of a vehicle, comprising an electromagnetic actuator generating a driving force for vibration damping of the vehicle, wherein
   a linear motor of the electromagnetic actuator includes a cylindrical rod member and a hollow cylindrical housing surrounding the rod member and extending along an axis of the rod member;
   the rod member and the housing are arranged so as to freely move back and forth along the axis with respect to each other;
   the rod member is configured to include a cylindrical shaft and a hollow cylindrical pipe surrounding the cylindrical shaft;
   the cylindrical shaft and the hollow cylindrical pipe are arranged concentrically with each other;
   the cylindrical shaft is made of a conductive member and the hollow cylindrical pipe is made of a nonconductive member;
   a plurality of armature coils are provided in a stacked state along the axis in a circumferential gap defined by an outer peripheral wall of the cylindrical shaft and an inner peripheral wall of the hollow cylindrical pipe inside the rod member;
   the housing is provided with a magnet member that exerts electromagnetic induction with each of the plurality of armature coils provided on the rod member, and
   armature coils located on ends of the rod member among the plurality of the armature coils are provided with electromagnetic braking parts that restrict back and forth movements of the rod member and the housing with respect to each other along the axis;
   the electromagnetic braking part includes a short-circuit part in which a pair of terminals provided in each of the armature coils located on the ends of the rod member are short-circuited;
   the back-and-forth movements are suppressed by the electromagnetic induction caused between the short-circuit part and the magnet member provided in the housing; and
   the pair of terminals included by the armature coil on the ends of the rod member in the short-circuit part are isolated from a control power supply line for supplying control power to the plurality of the on-rod armature coils to be short-circuited therebetween.

2. The electrically powered suspension system according to claim 1, wherein each of the armature coils positioned respectively in an extension side and a compression side of the rod member is provided with the electromagnetic braking part.

3. The electrically powered suspension system according to claim 1, wherein a stroke margin of the linear motor of the electromagnetic actuator is larger at the compression side than that at the compression side when the vehicle is in a 1G stationary state.

4. The electrically powered suspension system according to claim 3, further comprising a stopper for suppressing the back-and-forth movements along the axis between the rod member and the housing,
   wherein the stopper is configured so that the suppressing of the back-and-forth movement by the stopper works after a time delay from suppressing of the back-and-forth movement by the electromagnetic braking part, when a stroke of the linear motor of the electromagnetic actuator occurs to reach the irregular region.

5. The electrically powered suspension system according to claim 3, wherein the electromagnetic braking part is configured to perform the suppressing of the back-and-forth movement when the vehicle is in a load state exceeding the 1G stationary state or a fully loaded state.

* * * * *